US010131162B2

(12) United States Patent
Shito (10) Patent No.: US 10,131,162 B2
(45) Date of Patent: Nov. 20, 2018

(54) LIGHT ILLUMINATING APPARATUS (71) Applicant: HOYA CANDEO OPTRONICS CORPORATION, Toda-shi, Saitama (JP)

(72) Inventor: Kazutaka Shito, Toda (JP)

(73) Assignee: HOYA CANDEO OPTRONICS CORPORATION, Toda-Shi, Saitama (JP)

(*) Notice: Subject to any disclaimer, the term of this patent is extended or adjusted under 35 U.S.C. 154(b) by 0 days.

(21) Appl. No.: 15/458,530

(22) Filed: Mar. 14, 2017

(65) Prior Publication Data

US 2017/0282597 A1 Oct. 5, 2017

(30) Foreign Application Priority Data

Mar. 30, 2016 (JP) .................... 2016-069788

(51) Int. Cl.
| | |
|---|---|
| B41J 11/00 | (2006.01) |
| G02B 19/00 | (2006.01) |
| G02B 27/09 | (2006.01) |
| F21V 5/00 | (2018.01) |
| B41J 2/45 | (2006.01) |

(52) U.S. Cl.
CPC ............ B41J 11/002 (2013.01); B41J 2/45 (2013.01); F21V 5/007 (2013.01); G02B 19/0014 (2013.01); G02B 19/0066 (2013.01); G02B 19/0095 (2013.01); G02B 27/0905 (2013.01); G02B 27/0911 (2013.01); G02B 27/0927 (2013.01); G02B 27/0955 (2013.01)

(58) Field of Classification Search
CPC ....................................................... B41J 11/002
See application file for complete search history.

(56) References Cited

U.S. PATENT DOCUMENTS

2009/0160923 A1* 6/2009 Custer ................ B41F 23/0453
347/102
2015/0070451 A1* 3/2015 Ikeda ...................... B41J 2/155
347/102

FOREIGN PATENT DOCUMENTS

| JP | S54126584 U | 9/1979 |
|---|---|---|
| JP | 2001-290055 A | 10/2001 |
| JP | 2004-212536 A | 7/2004 |
| JP | 2011-146646 A | 7/2011 |
| JP | 2012-174601 A | 9/2012 |
| JP | 2013-201226 A | 10/2013 |

(Continued)

Primary Examiner — Shelby Fidler
(74) Attorney, Agent, or Firm — Rabin & Berdo, P.C.

(57) ABSTRACT

Provided is a light illuminating apparatus for irradiating light of a line shape extending in a first direction and having a line width in a second direction. The light illuminating apparatus includes light emitting units, each including a substrate, light sources arranged at an interval along the first direction on the substrate and placed such that a direction of an optical axis is matched to a direction perpendicular to the substrate surface, and optical devices placed on optical paths of each light source to shape light from each light source into light with a predetermined divergence angle, wherein the light emitting units are arranged on an arc having its center at the irradiation position when viewed in the first direction, and an irradiation width in the second direction of light from the light emitting units is approximately equal within a preset range in a direction perpendicular to the irradiation surface.

20 Claims, 7 Drawing Sheets (56) References Cited

FOREIGN PATENT DOCUMENTS

| | | | |
|---|---|---|---|
| JP | 2014-075323 | A | 4/2014 |
| JP | 5815888 | * | 11/2015 |
| JP | 2016-025165 | A | 2/2016 |
| KR | 2015-0079798 | A | 7/2015 |
| KR | 2015-0093200 | A | 8/2015 |
| KR | 2015-0132880 | A | 11/2015 |
| WO | WO 2008-143183 | A1 | 11/2008 |
| WO | WO 2014-065081 | A1 | 5/2014 |

* cited by examiner

LIGHT ILLUMINATING APPARATUS

TECHNICAL FIELD

The present disclosure relates to a light illuminating apparatus that irradiates light of a line shape.

BACKGROUND ART

Conventionally, a printer designed to perform a printing task by transferring an ink that is curable by irradiation of ultraviolet (UV) light to a target object such as paper is known. Such a printer is equipped with a UV light illuminating apparatus to cure the ink on the target object. In keeping with the demand for lower power consumption or longer service life, a UV light illuminating apparatus configured to use a Light Emitting Diode (LED) as an alternative to a traditional discharge lamp for a light source is proposed (for example, Patent Literature 1).

The UV light illuminating apparatus (LED unit) disclosed in Patent Literature 1 is equipped with a plurality of base blocks where a plurality of LED modules (LED chips) is arranged at a regular interval in lengthwise direction (first direction) to emit light of a line shape. Each base block is inclined at a predetermined angle to focus light of a line shape emitted from each base block into a line at a predetermined position on a target object, and is arranged and placed at a predetermined interval in widthwise direction (second direction).

RELATED LITERATURES

Patent Literatures (Patent Literature 1) Japanese Patent Publication No. 2011-146646

DISCLOSURE

Technical Problem

SUMMARY OF THE INVENTION

Problem to be Solved by the Invention

According to the ultraviolet (UV) light illuminating apparatus disclosed in Patent Literature 1, it is possible to improve the irradiation intensity of UV light at a predetermined position on a target object, and allow for a uniform irradiation intensity distribution. However, a printer (for example, a sheet-fed offset printer), in which the UV light illuminating apparatus is mounted, performs a printing task on an target object to be illuminated with UV light, in many cases, a paper that is vulnerable to deformation, so the paper often flutters during conveyance. In the event that the target object is deformed, light of each line shape does not converge to a predetermined position on the target object, failing to obtain desired irradiation intensity and irradiation intensity distribution on the target object, resulting in non-uniformity in the dried state of the ink.

In view of these circumstances, the present disclosure is directed to providing a light illuminating apparatus that can irradiate light of a line shape with predetermined irradiation intensity and irradiation intensity distribution within a predetermined working distance.

Technical Solution

To achieve the object, a light illuminating apparatus of the present disclosure is a light illuminating apparatus for irradiating, to a predetermined irradiation position on a reference irradiation surface, light of a line shape extending in a first direction and having a predetermined line width in a second direction perpendicular to the first direction, and includes a plurality of light emitting units, each including a substrate, a plurality of light sources arranged at a predetermined interval along the first direction on the substrate and placed such that a direction of an optical axis is matched to a direction perpendicular to the substrate surface, and a plurality of optical devices placed on optical paths of each of the light sources to shape light from each of the light sources into light with a predetermined divergence angle, wherein the plurality of light emitting units is arranged on an arc having its center at the irradiation position when viewed in the first direction, and an irradiation width in the second direction of light emitted from the plurality of light emitting units is approximately equal within a predetermined range in a direction perpendicular to the irradiation surface.

By this configuration, within a predetermined range in a direction perpendicular to the irradiation surface, irradiation intensity distributions of ultraviolet light emitted from the plurality of light emitting units overlap with each other, so desired irradiation intensity and irradiation intensity distribution is obtained within the predetermined range (within a predetermined working distance).

Furthermore, preferably, the irradiation width is wider than the predetermined line width.

Furthermore, preferably, the irradiation intensity distributions in the second direction of light emitted from each of the light emitting units are approximately normal.

Furthermore, preferably, the irradiation intensity distributions of light emitted from each of the light emitting units overlap with each other within the predetermined range.

Furthermore, preferably, when an optical path length of light emitted from each of the light emitting units is a, and the irradiation width is b, an effective diameter of each of the optical devices is c, and the divergence angle is ±θ, the following conditional expression (1) may be satisfied:

$$\tan\theta = (b-c)/2a \qquad (1)$$

Furthermore, preferably, the divergence angle is in a range of ±10° to ±40°.

Furthermore, preferably, the plurality of light emitting units is arranged in line symmetry with a perpendicular line at the irradiation position as a symmetry axis, when viewed in the first direction.

Furthermore, preferably, the light is light of a wavelength that acts on an ultraviolet curable resin.

Advantageous Effects

As described above, according to the light illuminating apparatus of the present disclosure, it is possible to irradiate light of a line shape with predetermined irradiation intensity and irradiation intensity distribution within a predetermined working distance.

DETAILED DESCRIPTION OF MAIN ELEMENTS

1: Light illuminating apparatus
10: Case
10a: Opening
20: Base block
100, 100a, 100b, 100c, 100d, 100e: LED unit
110: LED module
111: LED device
113, 115: Lens

[Best Mode]

MODE FOR CARRYING OUT THE INVENTION

Hereinafter, the embodiments of the present disclosure will be described in detail with reference to the accompanying drawings. Furthermore, in the drawings, the same or equivalent elements are assigned with the same reference numerals, and its description is not repeated herein.

Figure 1A:
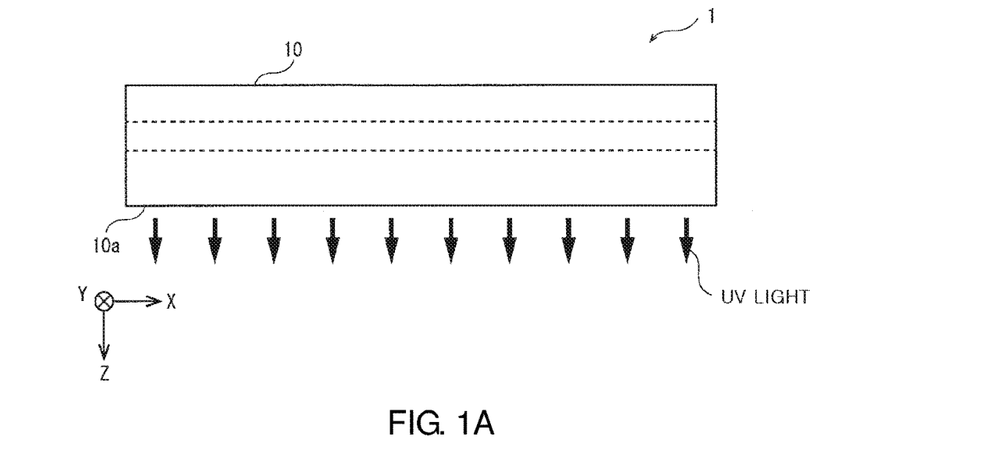
FIGS. 1A, 1B, and 1C are a diagram showing outward appearance of a light illuminating apparatus according to an embodiment of the present disclosure.
Figure 1B:
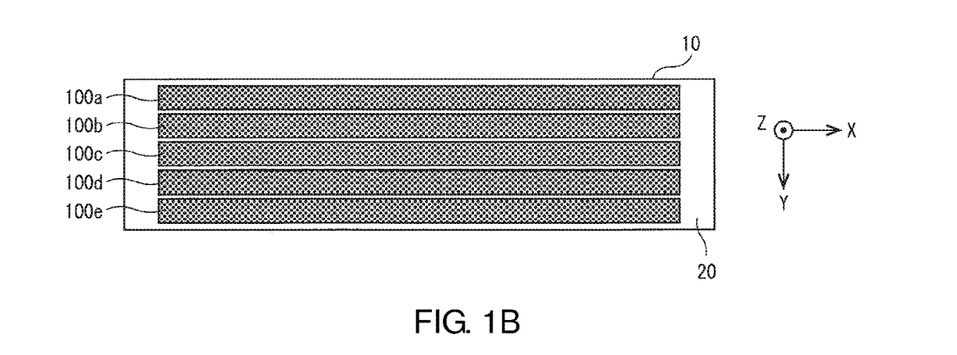
Figure 1C:
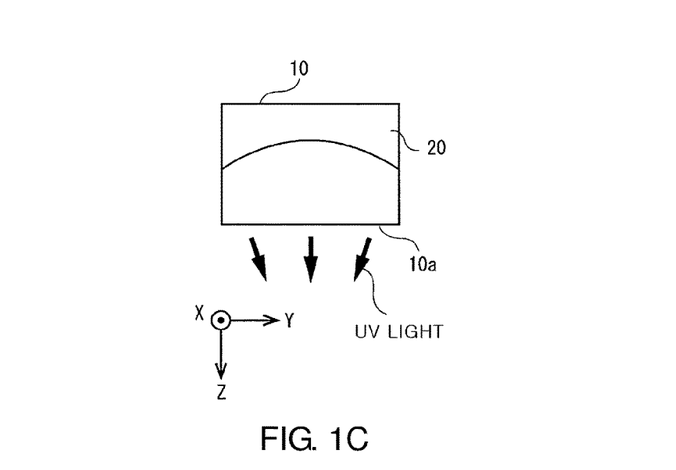
Figure 2:
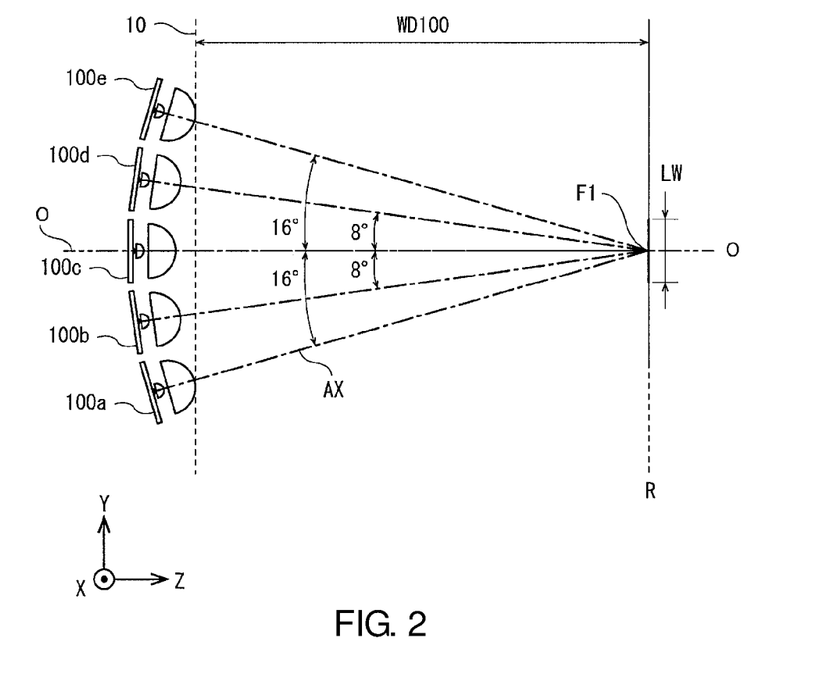
FIG. 2 is a diagram illustrating arrangement of light emitting diode (LED) units mounted in a light illuminating apparatus according to an embodiment of the present disclosure.

FIG. 1 is a diagram showing outward appearance of a light illuminating apparatus 1 according to an embodiment of the present disclosure. The light illuminating apparatus 1 of this embodiment is an apparatus that is mounted in a printer (not shown) designed to perform a printing task by transferring an ink that is curable by ultraviolet (UV) light to a target object such as paper, and as described below, is placed facing the target object and emits UV light of a line shape to the target object (FIG. 2). As used herein, a lengthwise (line length) direction of UV light of a line shape emitted from the light illuminating apparatus 1 is defined as X-axis direction (first direction), a widthwise (line width) direction is defined as Y-axis direction (second direction), and a direction perpendicular to X axis and Y axis is defined as Z-axis direction. FIG. 1A is a front view of the light illuminating apparatus 1 when viewed in Y-axis direction. FIG. 1B is a bottom view of the light illuminating apparatus 1 when viewed in Z-axis direction (when viewed from the bottom of FIG. 1B to the top). FIG. 10 is a side view of the light illuminating apparatus 1 when viewed in X-axis direction (when viewed from the right side of FIG. 1A to the left side).

As shown in FIG. 1, the light illuminating apparatus 1 is equipped with a case 10, a base block 20, and five light emitting diode (LED) units 100a, 100b, 100c, 100d, 100e (hereinafter, collectively referred to as a「LED unit 100」). The case 10 is a case (housing) designed to receive the base block 20 and the LED unit (light emitting unit) 100. Furthermore, the LED units 100a, 100b, 100c, 100d, 100e are all units designed to emit UV light of a line shape parallel to X-axis direction (as described in detail below).

The base block 20 is a support member for fixing the LED units 100a, 100b, 100c, 100d, 100e, and is formed of metal such as stainless steel. As shown in FIGS. 1B and 10, the base block 20 is a plate-shaped member with an approximately rectangular shape that extends in X-axis direction, and the lower surface is formed as a partial cylindrical surface dented along Y-axis direction. On the lower surface (i.e., the partial cylindrical surface) of the base block 20, the LED units 100a, 100b, 100c, 100d, 100e extending in X-axis direction are arranged and placed along Y-axis direction (i.e., along the partial cylindrical surface), and are fixedly attached by screw fixing or soldering.

The lower surface of the case 10 (the lower surface of the light illuminating apparatus 1) has an opening 10a, and is configured to emit UV light from the LED units 100a, 100b, 100c, 100d, 100e toward the target object through the opening 10a.

FIG. 2 is a diagram illustrating arrangement of the LED units 100a, 100b, 100c, 100d, 100e mounted in the light illuminating apparatus 1 according to this embodiment, and shows arrangement of the LED units 100a, 100b, 100c, 100d, 100e when viewed in X-axis direction. As shown in FIG. 2, the light illuminating apparatus 1 of this embodiment has five LED units 100a, 100b, 100c, 100d, 100e arranged in the shape of an arc along the partial cylindrical surface of the base block 20 when viewed in X-axis direction (as described in detail below). In FIG. 2,「R」denotes a reference irradiation surface on which the target object is conveyed, and an alternate long and short dash line indicates optical axes AX of each LED unit 100a, 100b, 100c, 100d, 100e. Furthermore,「F」is a reference irradiation position on the irradiation surface R at which each optical axis AX intersects, an alternate long and two short dash line indicates a center line O (i.e., a perpendicular line at the irradiation position F1) of the light illuminating apparatus 1, and「LW」denotes a line width of UV light at the reference irradiation position F1.

Figure 3:
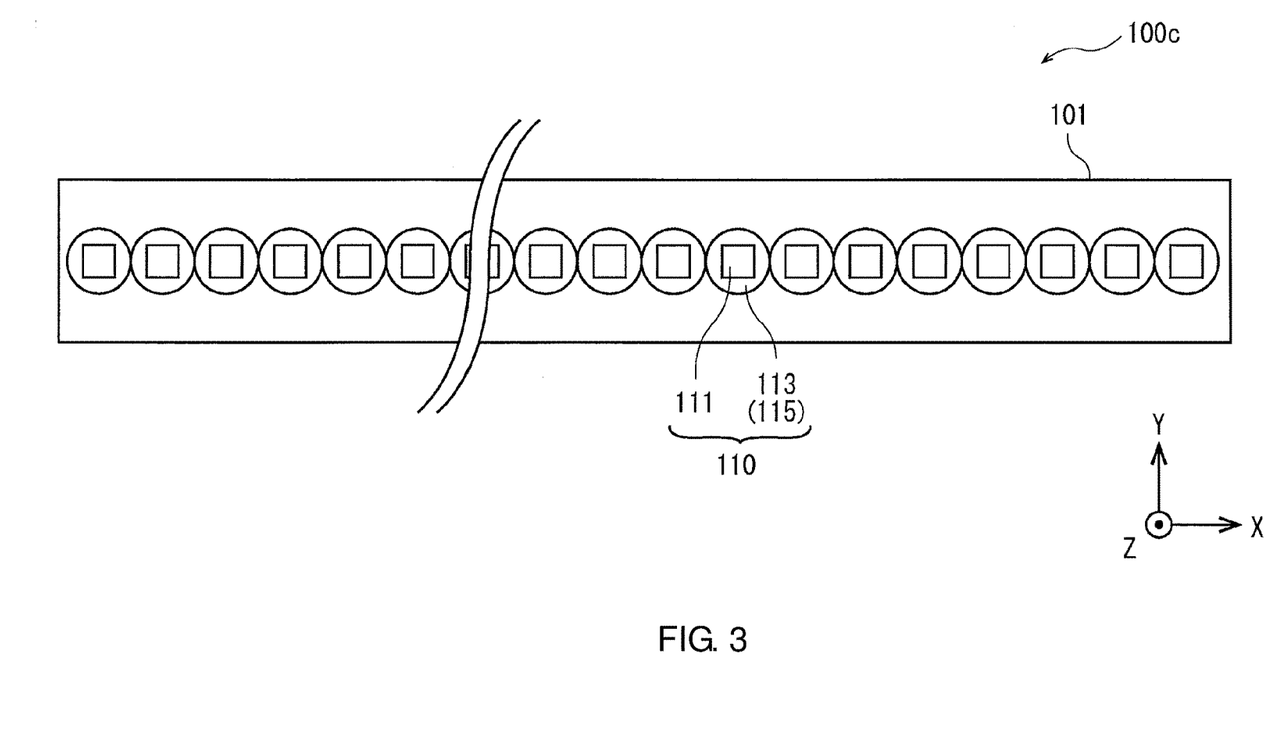
FIG. 3 is a diagram illustrating construction of a LED unit mounted in a light illuminating apparatus according to an embodiment of the present disclosure.
Figure 4:
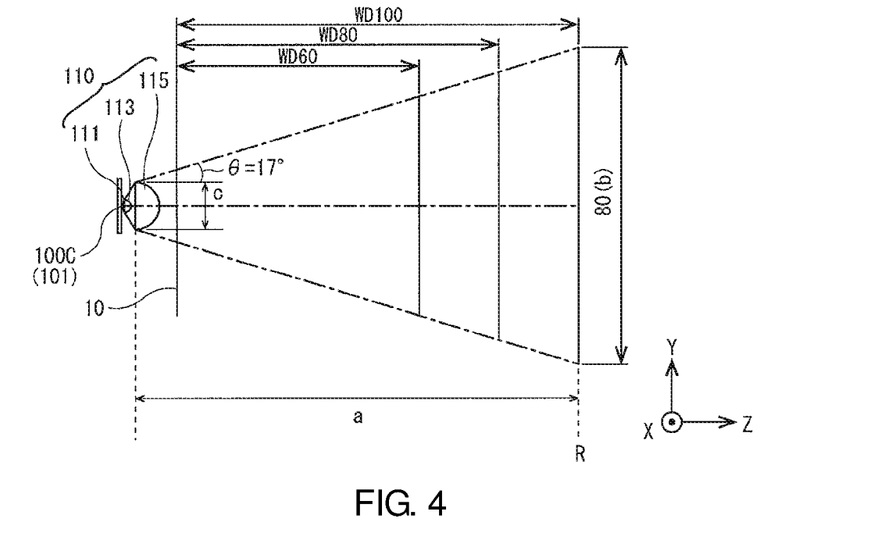
FIG. 4 is a light beam diagram illustrating construction of a LED unit mounted in a light illuminating apparatus according to an embodiment of the present disclosure, and an irradiation width of UV light emitted from the LED unit.

Because each LED unit 100a, 100b, 100c, 100d, 100e of this embodiment has common construction but only different in placement, hereinafter, the LED unit 100c is representatively described. FIG. 3 is a diagram illustrating construction of the LED unit 100c, and shows the LED unit 100c when viewed in Z-axis direction. Furthermore, FIG. 4 is a light beam diagram illustrating construction of the LED unit 100c, and an irradiation width of UV light emitted from the LED unit 100c. Furthermore, in FIG. 4, only a beam (i.e., a beam with a divergence angle of 0°) passing through the optical axis AX and a beam with a divergence angle of ±17°, emitted from the LED unit 100c are indicated by an alternate long and short dash line.

As shown in FIG. 3, the LED unit 100c is equipped with a substrate 101 of a rectangular shape that extends in X-axis direction, and 320 LED modules 110. The LED modules 110 of the LED unit 100c are densely arranged on the substrate 101 in X-axis direction, and are electrically connected to the substrate 101. The substrate 101 of the LED unit 100c is connected to a LED driving circuit of the printer not shown, and each LED module 110 is supplied with a drive current from the LED driving circuit through the substrate 101. When the drive current is supplied to each LED module 110, an amount of UV light proportional to the drive current is emitted from each LED module 110, and UV light of a line shape parallel to X axis is emitted from the LED unit 100c. Furthermore, each LED module 110 of this embodiment is supplied with the drive current adjusted to emit approximately the same amount of UV light, and UV light of a line shape emitted from the LED unit 100c has an approximately uniform irradiation intensity distribution in X-axis direction (as described in detail below).

As shown in FIGS. 3 and 4, each LED module 110 of the LED unit 100c is equipped with a LED device 111 (light source), and a lens 113 and a lens 115 (optical device).

The LED device 111 has a light emitting surface of an approximately square shape, and is supplied with the drive current from the LED driving circuit not shown and emits UV light of a cure wavelength (for example, 365 nm, 385 nm, 395 nm, 405 nm) of the ink.

As shown in FIG. 4, the lens 113 and the lens 115 held by a lens holder not shown are arranged on the optical axes of each LED device 111 of the LED module 110. The lens 113 has a plano-convex lens made of, for example, optical glass or light transmitting resin with a flat surface on the LED device 111 side, and spreads outward from the LED device 111 to allow incident UV light to be focused and guided toward the lens 115 at the rear end. The lens 115 has a plano-convex lens made of, for example, optical glass or light transmitting resin with a flat surface on the lens 113 side, and shapes UV light incident from the lens 113 into light with a predetermined divergence angle (for example, ±17°). That is, each LED module 110 of this embodiment has a non-imaging optical system mounted therein, and is configured to perform irradiation with an irradiation width of about 80 mm (Y-axis direction) at the position 100 mm away in Z-axis direction from the edge of the case 10 (indicated by ⌈WD100⌋ in FIG. 4). In other words, as shown in FIG. 4, when an optical path length (a distance from the exit surface of the lens 115 to the reference irradiation position F1) of UV light emitted from the LED modules 110 is a, an irradiation width is b, an effective diameter of the lens 115 is c, and a divergence angle of UV light emitted from the lens 115 is ±θ, the LED unit 100c of this embodiment is configured to satisfy the following conditional expression (1):

$$\tan\theta = (b-c)/2a \quad (1)$$

The arrangement of the LED units 100a, 100b, 100c, 100d, 100e is now described. As shown in FIG. 2, the LED units 100a, 100b, 100c, 100d, 100e of this embodiment are each arranged at the position of 0°, ±8°, and ±16° with respect to the center line O on an arc of a circle with a 120 mm radius around the reference irradiation position F1, when viewed in X-axis direction, so that the optical axes AX of each LED unit 100a, 100b, 100c, 100d, 100e pass through the reference irradiation position F1. That is, the five LED units 100a, 100b, 100c, 100d, 100e are arranged in line symmetry with respect to the center line O as a symmetry axis when view in X-axis direction. Furthermore, each LED unit 100a, 100b, 100c, 100d, 100e is configured to emit UV light therefrom toward the reference irradiation position F1 on the reference irradiation surface R, and obtain a predetermined irradiation intensity in the range of line width LW of the reference irradiation position F1. That is, the line width LW is a zone having the irradiation intensity above a predetermined value (for example, 3.5 W/cm²) necessary to cure the ink in the irradiation intensity distribution of Y-axis direction, and in this embodiment, is set to the range of about ±15 mm (i.e., the line width LW of about 30 mm) with respect to the reference irradiation position F1. Furthermore, the line length LL is a zone having the irradiation intensity above a predetermined value (for example, 3.5 W/cm²) necessary to cure the ink in the irradiation intensity distribution of X-axis direction, and in this embodiment, is set to about 600 mm.

Furthermore, in the light illuminating apparatus 1 of this embodiment, the X-Y plane at the position 100 mm away in Z-axis direction from the edge of the case 10 (indicated by ⌈WD100⌋ in FIG. 2) is defined as the reference irradiation surface R, and the target object is configured to be conveyed along Y-axis direction on the reference irradiation surface R by a conveyor apparatus of the printer not shown. Accordingly, as the target object is sequentially conveyed on the reference irradiation surface R, UV light emitted from the LED units 100a, 100b, 100c, 100d, 100e sequentially moves (scans) on the target object and sequentially cures (settles down) the ink on the target object. Furthermore, in this specification, the distance in Z-axis direction from the edge of the case 10 is referred to as a working distance WD of the light illuminating apparatus 1, and hereinafter, for example, the position at the working distance of 100 mm is referred to as ⌈WD100⌋.

As described above, UV light of a multi-line shape emitted from the LED units 100a, 100b, 100c, 100d, 100e is focused on the target object (i.e., the reference irradiation position F1 on the reference irradiation surface R) to settle down the ink on the target object. Here, from the viewpoint of the irradiation intensity of UV light necessary to settle down the ink, it is preferred to focus UV light of a multi-line shape within a range narrow as possible on the target object. However, in many cases, the target object to be illuminated with UV light is paper, and often flutters during conveyance (i.e., varying position in Z-axis direction). As described above, if the position of the target object varies in Z-axis direction (i.e., if the target object does not pass through the reference irradiation surface R), UV light of each line shape is incident on the target object at the position different from a predetermined working distance, failing to irradiate a predetermined irradiation intensity of UV light on the target object. Furthermore, if the irradiation intensity of UV light does not reach the irradiation intensity necessary to settle down the ink, non-uniformity in the dried state of the ink occurs. Thus, as a result of a careful review, the inventors found out that each LED module 110 employs a non-imaging optical system and is configured to irradiate each UV light with a predetermined irradiation width on the reference irradiation surface R, as well as approximately normal distributions of irradiation intensity in Y-axis direction of UV light of a line shape emitted from each LED unit 100a, 100b, 100c, 100d, 100e, so that the irradiation intensity distributions of each UV light overlap with each other, thereby obtaining desired irradiation intensity and irradiation intensity distribution of UV rays between predetermined working distances (for example, between WD60 and WD100), and completed the invention.

Figure 5:
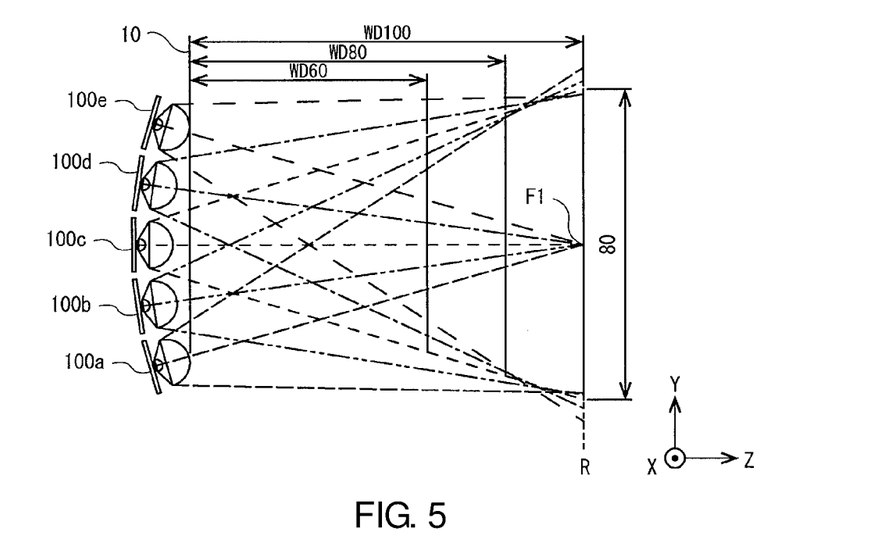
FIG. 5 is a light beam diagram of UV light emitted from LED units mounted in a light illuminating apparatus according to an embodiment of the present disclosure.

FIG. 5 is a light beam diagram of UV light from the LED units 100a, 100b, 100c, 100d, 100e of this embodiment when viewed in X-axis direction. Furthermore, in FIG. 5, only a beam passing through the optical axis AX (i.e., a beam with a divergence angle of 0°) and a beam with a divergence angle of ±17°, emitted from each LED unit 100a, 100b, 100c, 100d, 100e, are shown.

As shown in FIG. 5, the LED units 100a, 100b, 100c, 100d, 100e of this embodiment are configured to irradiate UV light emitted from each LED unit 100a, 100b, 100c, 100d, 100e with the irradiation width of about 80 mm (Y-axis direction) with respect to the reference irradiation position F1 on the reference irradiation surface R (WD100).

Figure 6A:
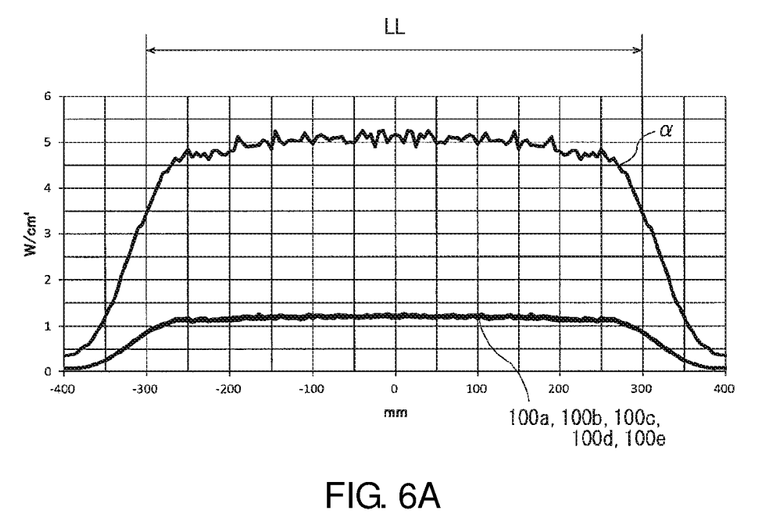
FIGS. 6A and 6B are a diagram showing an irradiation intensity distribution at the position of WD100 of UV light emitted from a light illuminating apparatus according to an embodiment of the present disclosure.
Figure 6B:
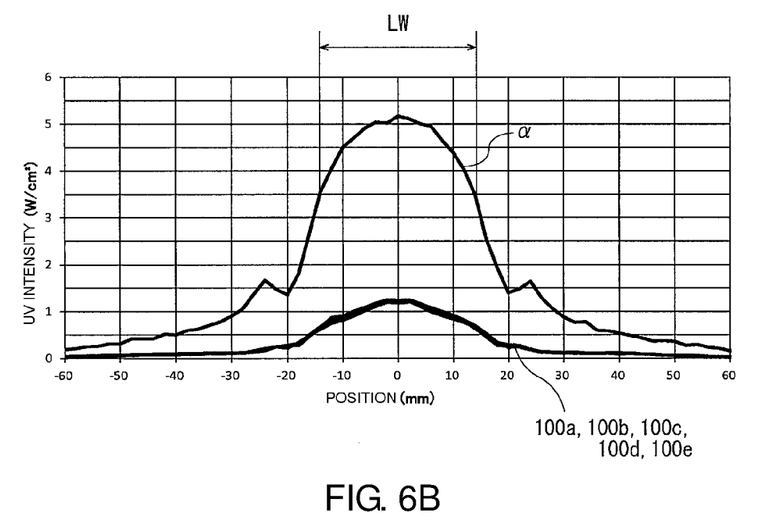
Figure 7A:
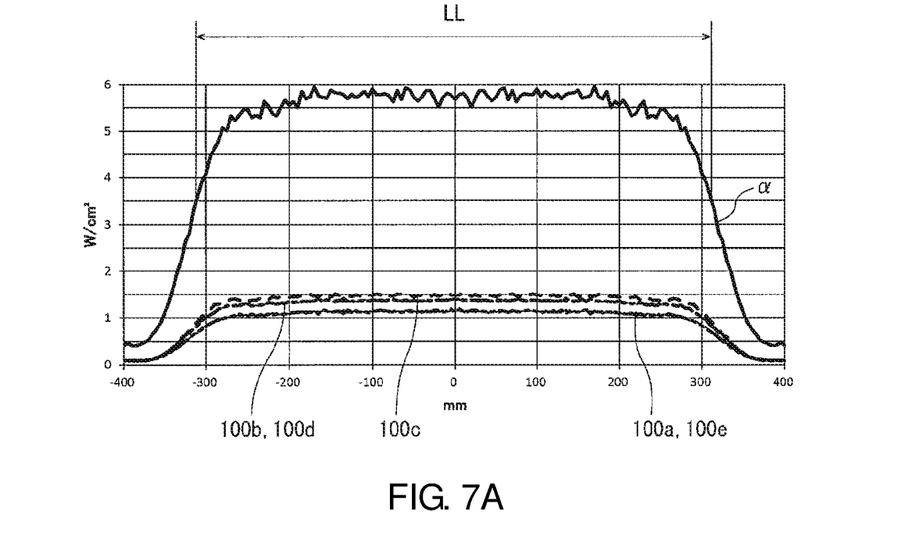
FIGS. 7A and 7B are a diagram showing an irradiation intensity distribution at the position of WD80 of UV light emitted from a light illuminating apparatus according to an embodiment of the present disclosure.
Figure 7B:
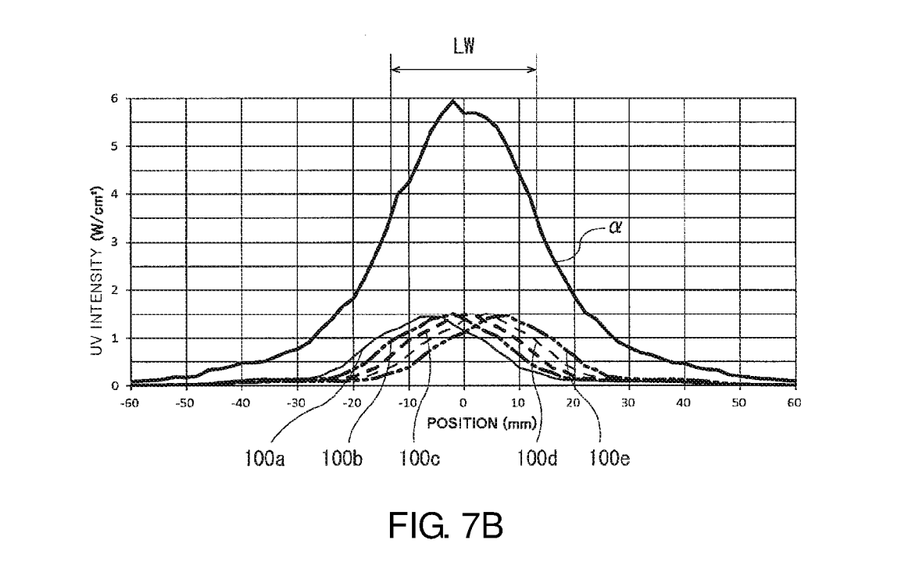
Figure 8A:
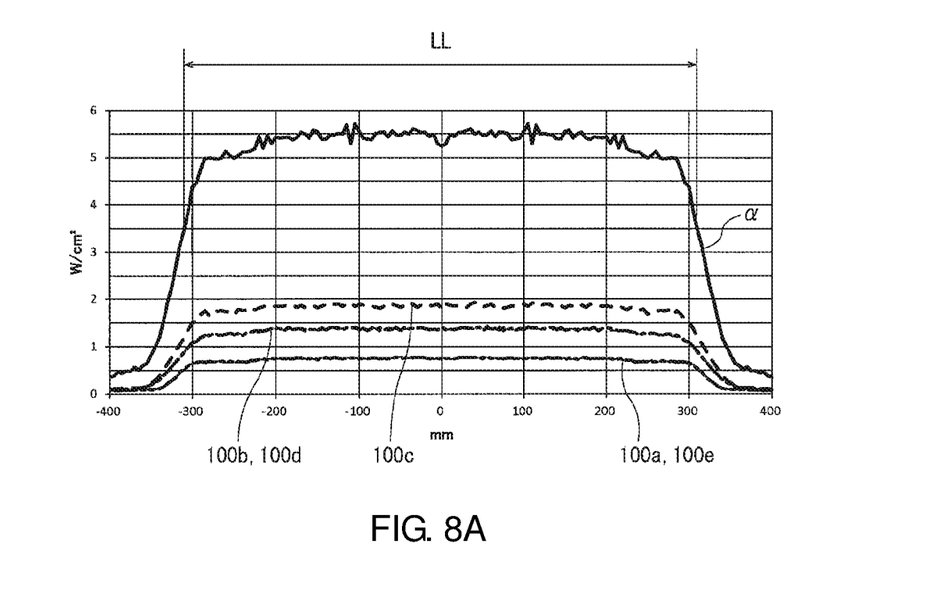
FIGS. 8A and 8B are a diagram showing an irradiation intensity distribution at the position of WD60 of UV light emitted from a light illuminating apparatus according to an embodiment of the present disclosure.
Figure 8B:
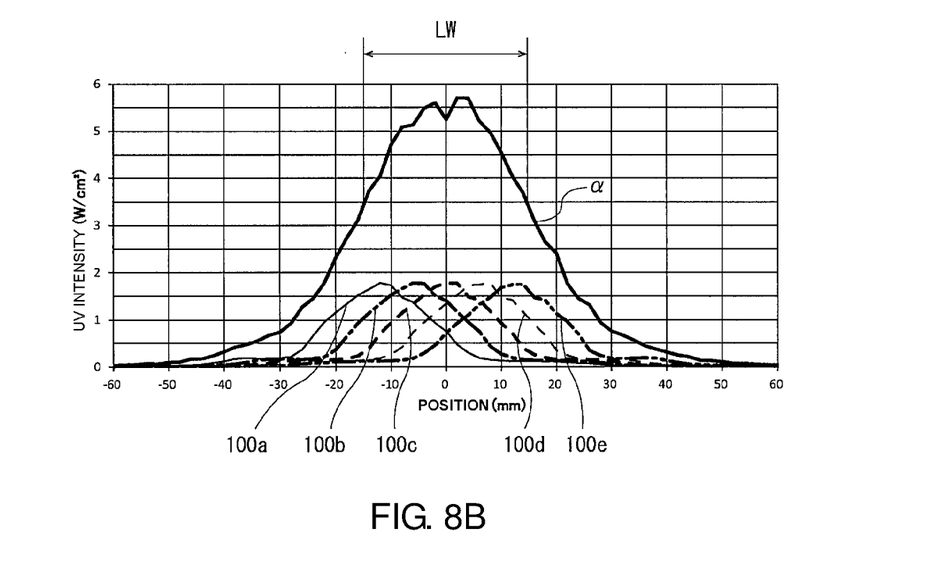

FIGS. 6 through 8 are diagrams showing the irradiation intensity distribution of UV light emitted from the light illuminating apparatus 1 of this embodiment. FIG. 6 shows the irradiation intensity distribution of UV light at the position of WD100, FIG. 7 shows the irradiation intensity distribution of UV light at the position of WD80, and FIG. 8 shows the irradiation intensity distribution of UV light at the position of WD60. Furthermore, FIGS. 6A, 7A, and 8A show the irradiation intensity distribution of X-axis direction at the position of the center line O on the X-Y plane, in which the horizontal axis is the distance when the center in lengthwise direction of the light illuminating apparatus 1 (i.e., the position of ½ of the line length LL (length in X-axis direction) of UV light) is 「0 mm」, and the vertical axis is the irradiation intensity (W/cm$^2$) of UV light per unit area. Furthermore, FIGS. 6B, 7B, and 8B show the irradiation intensity distribution of Y-axis direction at the center position in lengthwise direction of the light illuminating apparatus 1 on the X-Y plane (i.e., the position of ½ of the line length LL (length in X-axis direction) of UV light), in which the horizontal axis is the distance when the center line O is 「0 mm」, and the vertical axis is the irradiation intensity (W/cm$^2$) of UV light per unit area. Furthermore, in FIGS. 6, 7, and 8, 「100a」, 「100b」, 「100c」, 「100d」, 「100e」 respectively represent the irradiation intensity distribution of UV light emitted from each LED unit 100a, 100b, 100c, 100d, 100e, and 「α」 represents the sum of irradiation intensity of UV light emitted from the five LED units 100a, 100b, 100c, 100d, 100e (i.e., the irradiation intensity of UV light emitted from the light illuminating apparatus 1).

As shown in FIG. 6, because at the position of WD100, UV light emitted from each LED unit 100a, 100b, 100c, 100d, 100e overlaps with respect to the reference irradiation position F1 (FIG. 5), the irradiation intensity distributions of UV light emitted from each LED unit 100a, 100b, 100c, 100d, 100e are approximately equal in X-axis direction (FIG. 6A) and Y-axis direction (FIG. 6B). Furthermore, the sum α of irradiation intensity of UV light emitted from the five LED units 100a, 100b, 100c, 100d, 100e is a predetermined value (3.5 W/cm$^2$) or more within the range of ±300 mm in X-axis direction (FIG. 6A) and a predetermined value (3.5 W/cm$^2$) or more within the range of ±15 mm in Y-axis direction (FIG. 6B). That is, at the position of WD100, UV light of a line shape is irradiated with the line length LL of about 600 mm and the line width LW of about 30 mm. Furthermore, as shown in FIG. 6B, the irradiation intensity distributions of UV light emitted from each LED unit 100a, 100b, 100c, 100d, 100e in Y-axis direction are approximately normal within the range of about ±40 mm, and are matched to the irradiation width (80 mm) of each LED module 110 described above.

As shown in FIG. 7, because at the position of WD80, the optical axes of each LED unit 100a, 100b, 100c, 100d, 100e are slightly away in Y-axis direction, and the distance from each LED unit 100a, 100b, 100c, 100d, 100e is also slightly different, the irradiation intensity distributions of UV light emitted from each LED unit 100a, 100b, 100c, 100d, 100e are slightly away in X-axis direction (FIG. 7A) and Y-axis direction (FIG. 7B). However, as the irradiation intensity distributions of UV light emitted from each LED unit 100a, 100b, 100c, 100d, 100e overlap with each other, the sum α of irradiation intensity of UV light emitted from the five LED units 100a, 100b, 100c, 100d, 100e is a predetermined value of (3.5 W/cm$^2$) or more within the range of about ±320 mm in X-axis direction (FIG. 7A) and a predetermined value (3.5 W/cm$^2$) or more within the range of about ±13 mm in Y-axis direction (FIG. 7B). That is, at the position of WD80, UV light of a line shape is irradiated with the line length LL of about 640 mm and the line width LW of about 26 mm. Furthermore, as shown in FIG. 7B, the irradiation intensity distributions of UV light emitted from each LED unit 100a, 100b, 100c, 100d, 100e in Y-axis direction have a slightly higher peak intensity than that of WD100, but are approximately normal within the range of about ±40 mm and are matched to the irradiation width (80 mm) of each LED module 110 described above.

As shown in FIG. 8, because at the position of WD60, the optical axes of each LED unit 100a, 100b, 100c, 100d, 100e are farther away in Y-axis direction, and the distance from each LED unit 100a, 100b, 100c, 100d, 100e is also further different, the irradiation intensity distributions of UV light emitted from each LED unit 100a, 100b, 100c, 100d, 100e are farther away in X-axis direction (FIG. 8A) and Y-axis direction (FIG. 8B). However, the irradiation intensity distributions of UV light emitted from each LED unit 100a, 100b, 100c, 100d, 100e overlap with each other, and the sum α of irradiation intensity of UV light emitted from the five LED units 100a, 100b, 100c, 100d, 100e is a predetermined value (3.5 W/cm$^2$) or more within the range of about ±320 mm in X-axis direction (FIG. 8A) and a predetermined value (3.5 W/cm$^2$) or more within the range of about ±15 mm in Y-axis direction (FIG. 8B). That is, at the position of WD60, UV light of a line shape is irradiated with the line length LL of about 640 mm and the line width LW of about 30 mm. Furthermore, as shown in FIG. 8B, the irradiation intensity distributions of UV light emitted from each LED unit 100a, 100b, 100c, 100d, 100e in Y-axis direction have a much higher peak intensity than that of WD80, but are approximately normal within the range of about ±40 mm and are matched to the irradiation width (80 mm) of each LED module 110 described above.

As described above, the light illuminating apparatus 1 of this embodiment employs a non-imaging optical system in each LED module 110 and has each LED unit 100a, 100b, 100c, 100d, 100e arranged on an arc of a circle with a circumference around the reference irradiation position F1. Furthermore, each UV light of a line shape emitted from each LED unit 100a, 100b, 100c, 100d, 100e is allowed to be irradiated with a predetermined irradiation width on the reference irradiation surface R as well as approximately normal distributions of irradiation intensity in Y-axis direction, so that the irradiation intensity distributions of each UV light overlap with each other, thereby obtaining desired irradiation intensity and irradiation intensity distribution of UV rays within the range of WD60-WD100. That is, because the irradiation intensity distribution of UV light emitted from the light illuminating apparatus 1 is approximately uniform within the range of WD60-WD100, even though the target object (for example, paper) to be illuminated with UV light flutters within the range of WD60-WD100, an irradiation intensity of UV light necessary to settle down the ink can be uniformly irradiated on the target object, so the dried state of the ink is stable (i.e., non-uniformity in the dried state does not occur).

While this embodiment has been hereinabove described, the present disclosure is not limited to the foregoing configuration, and many modifications may be made within the scope of the technical spirit of the present disclosure.

For example, although this embodiment is configured to irradiate uniform UV light within the range of WD60-WD100 under the condition in which the position of WD100 is the reference irradiation surface R and the flutter range of the target object, paper, is the range of WD60-WD100, the range of working distance is not limited thereto and may be appropriately changed depending on the specification.

Furthermore, although the divergence angle of UV light emitted from the lens 115 is set to ±17° in this embodiment, the divergence angle is not limited thereto. The divergence angle of UV light emitted from the lens 115 may be appropriately changed depending on the flutter range (i.e., the range of working distance) of the target object, paper, or the irradiation intensity of UV light necessary to settle down the ink, and is preferably in the range of ±10° to ±40°, and more preferably the range of ±15° to ±30°. Furthermore, when the divergence angle of UV light emitted from the lens 115 is smaller than ±10°, the range of working distance for obtaining desired irradiation intensity and irradiation intensity distribution becomes narrow.

Furthermore, when the divergence angle of UV light emitted from the lens 115 is greater than ±40°, it is impossible to obtain desired irradiation intensity and irradiation intensity distribution.

Furthermore, it should be understood that the disclosed experiments are illustrative in all aspects and are not imitative. The scope of the present disclosure is defined by the appended claims rather than the foregoing description, and encompasses all changes within the meaning and scope of equivalents to the claims.

The invention claimed is:

1. A light illuminating apparatus for irradiating, to a preset irradiation position on a reference irradiation surface, light of a line shape extending in a first direction and having a preset line width in a second direction perpendicular to the first direction, wherein the preset line width corresponds to a region of irradiation intensity exceeding a predetermined value, the light illuminating apparatus comprising:
a plurality of light emitting units, each comprising a substrate, a plurality of light sources arranged at a preset interval along the first direction on the substrate and placed such that a direction of an optical axis is matched to a direction perpendicular to the substrate surface, and a plurality of optical devices placed on optical paths of each of the light sources to shape light from each of the light sources into light with a preset divergence angle,
wherein the plurality of light emitting units is arranged within the range of ±16° with respect to a center line on an arc of a circle around the preset irradiation position so that the optical axes of the light emitting units intersect on the reference irradiation surface, when viewed in the first direction, thereby maintaining the preset line width within a predetermined range of between 80 mm and 100 mm of a working distance of the light illuminating apparatus.

2. The light illuminating apparatus according to claim 1, wherein the irradiation width is wider than the preset line width.

3. The light illuminating apparatus according to claim 2, wherein irradiation intensity distributions in the second direction of light emitted from each of the light emitting units are approximately normal.

4. The light illuminating apparatus according to claim 3, wherein irradiation intensity distributions of light emitted from each of the light emitting units overlap with each other within the preset range.

5. The light illuminating apparatus according to claim 4, wherein when an optical path length of light emitted from each of the light emitting units is a, and the irradiation width is b, an effective diameter of each of the optical devices is c, and the divergence angle is ±θ, the following conditional expression (1) is satisfied:

$$\tan\theta = (b-c)/2a \qquad (1).$$

6. The light illuminating apparatus according to claim 3, wherein when an optical path length of light emitted from each of the light emitting units is a, and the irradiation width is b, an effective diameter of each of the optical devices is c, and the divergence angle is ±θ, the following conditional expression (1) is satisfied:

$$\tan\theta = (b-c)/2a \qquad (1).$$

7. The light illuminating apparatus according to claim 2, wherein irradiation intensity distributions of light emitted from each of the light emitting units overlap with each other within the preset range.

8. The light illuminating apparatus according to claim 7, wherein when an optical path length of light emitted from each of the light emitting units is a, and the irradiation width is b, an effective diameter of each of the optical devices is c, and the divergence angle is ±θ, the following conditional expression (1) is satisfied:

$$\tan\theta = (b-c)/2a \qquad (1).$$

9. The light illuminating apparatus according to claim 2, wherein when an optical path length of light emitted from each of the light emitting units is a, and the irradiation width is b, an effective diameter of each of the optical devices is c, and the divergence angle is ±θ, the following conditional expression (1) is satisfied:

$$\tan\theta = (b-c)/2a \qquad (1).$$

10. The light illuminating apparatus according to claim 1, wherein irradiation intensity distributions in the second direction of light emitted from each of the light emitting units are approximately normal.

11. The light illuminating apparatus according to claim 10, wherein irradiation intensity distributions of light emitted from each of the light emitting units overlap with each other within the preset range.

12. The light illuminating apparatus according to claim 11, wherein when an optical path length of light emitted from each of the light emitting units is a, and the irradiation width is b, an effective diameter of each of the optical devices is c, and the divergence angle is ±θ, the following conditional expression (1) is satisfied:

$$\tan\theta = (b-c)/2a \qquad (1).$$

13. The light illuminating apparatus according to claim 10, wherein when an optical path length of light emitted from each of the light emitting units is a, and the irradiation width is b, an effective diameter of each of the optical devices is c, and the divergence angle is ±θ, the following conditional expression (1) is satisfied:

$$\tan\theta = (b-c)/2a \qquad (1).$$

14. The light illuminating apparatus according to claim 1, wherein irradiation intensity distributions of light emitted from each of the light emitting units overlap with each other within the preset range.

15. The light illuminating apparatus according to claim 14, wherein when an optical path length of light emitted from each of the light emitting units is a, and the irradiation width is b, an effective diameter of each of the optical devices is c, and the divergence angle is ±θ, the following conditional expression (1) is satisfied:

$$\tan\theta = (b-c)/2a \qquad (1).$$

16. The light illuminating apparatus according to claim 1, wherein when an optical path length of light emitted from each of the light emitting units is a, and the irradiation width is b, an effective diameter of each of the optical devices is c, and the divergence angle is ±θ, the following conditional expression (1) is satisfied:

$$\tan \theta = (b-c)/2a \qquad (1).$$

17. The light illuminating apparatus according to claim 1, wherein the divergence angle is in a range of ±10° to ±40°.

18. The light illuminating apparatus according to claim 1, wherein the plurality of light emitting units is arranged in line symmetry with a perpendicular line at the irradiation position as a symmetry axis, when viewed in the first direction.

19. The light illuminating apparatus according to claim 1, wherein the light is light of a wavelength that acts on an ultraviolet curable resin.

20. The light illuminating apparatus according to claim 1, wherein each of the plurality of optical devices includes a first lens and a second lens, the first lens having an outer surface extending from an outer surface of a respective one of the plurality of light emitting units to an outer edge of the second lens, wherein the second lens has a flat surface abutting a flat surface of the first lens and a convex surface for emitting the light within the preset range in the direction perpendicular to the irradiation surface.

* * * * *